Figure 1:
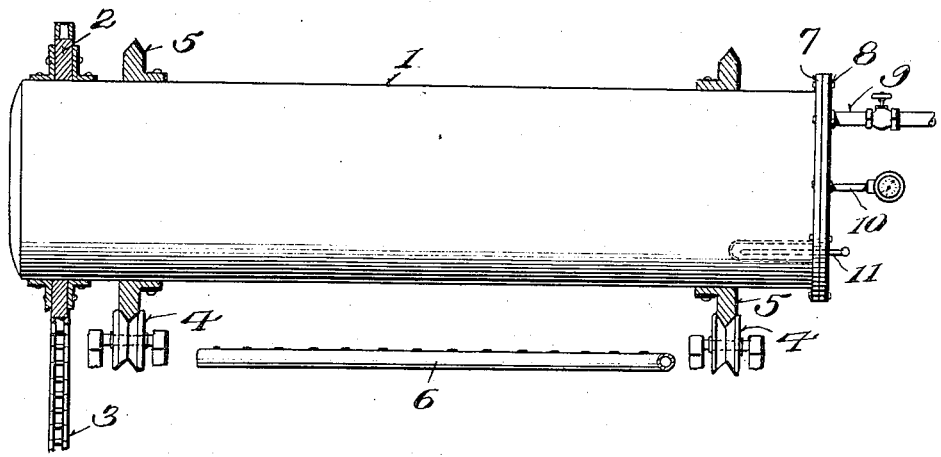

H. ESSEX & B. T. BROOKS.
PROCESS OF MAKING AMYL ACETATE.
APPLICATION FILED DEC. 8, 1915.

1,197,019.

Patented Sept. 5, 1916.

Witness

Inventors
Harry Essex
and
Benjamin T Brooks
By K. P. McElroy
Attorney

UNITED STATES PATENT OFFICE.

HARRY ESSEX AND BENJAMIN T. BROOKS, OF PITTSBURGH, PENNSYLVANIA, ASSIGNORS TO GULF REFINING COMPANY, OF PITTSBURGH, PENNSYLVANIA, A CORPORATION OF TEXAS.

PROCESS OF MAKING AMYL ACETATE.

1,197,019.  Specification of Letters Patent.  Patented Sept. 5, 1916.

Application filed December 3, 1915. Serial No. 35,708.

*To all whom it may concern:*

Be it known that we, HARRY ESSEX and BENJAMIN T. BROOKS, citizens of the United States, and residents of Pittsburgh, in the county of Allegheny and State of Pennsylvania, have invented certain new and useful Improvements in Processes of Making Amyl Acetate, of which the following is a specification.

This invention relates to processes of making amyl acetate; and it comprises a process of making synthetic solvents, such as amyl acetate and other similar solvents of ester nature, wherein chlor-substitution products of the hydrocarbons are heated in the presence of alkali salts of the acids whose esters are desired, as for instance in the presence of sodium acetate in making acetic esters, a co-solvent for the chlorin compound and for the alkali salt which is used being also present if desired, the mixture being agitated or disturbed during the heating at such a rate as will suffice to keep the solid matters present in motion and to maintain the co-solvent, (if such be used) and the reaction liquids saturated with the maximum amount of the alkali salt which can be dissolved therein; and it more particularly comprises a process of making synthetic amyl acetate and similar ester preparations wherein a chlorinated hydrocarbon or mixture of chlorinated hydrocarbons, which is advantageously made by methodically chlorinating a gasolene or benzin fraction, is admixed with dry sodium acetate, or another acetate, and, usually, a solvent liquid is added which may be pre-formed amyl acetate or a mixture of acetates, or which may be acetic acid, or which may be a mixture of esters and acetic acid, and the admixture is then heated in a suitable container under a suitable pressure to a suitable temperature, commonly in the neighborhood of 200° C. and during such heating the mixture is kept in continuous motion, best by rotating the container; all as more fully hereinafter set forth and as claimed.

Because of the high price of amyl acetate and the relative smallness of its supply, the search for artificial preparations of the same nature and for substances capable of replacing it as a solvent in the manufacture of celluloid and of other pyroxylin preparations, has been energetic. Amyl acetate as it is used in the arts is not a unitary material since it contains a number of other acetates as well as the true amyl acetates (pentyl acetates). The term "amyl acetate" is hereinafter used in this commercial sense. Such a mixture of solvents is practically more desirable than any one of the several acetates which compose it since it gives a regulated volatilization which is desirable in converting cellulose nitrates into clear and transparent films for varnishing and photographic purposes. Amyl acetate of the commercial type is considered as an unusually desirable solvent because it gives clear films and because it tolerates admixture with large quantities of "non-solvents" for pyroxylin such as benzin, benzol (benzene), etc. Most of the substitutes for amyl acetate which have been proposed do not have the desirable film-forming properties to the same extent. Many propositions have been made for producing "amyl acetate" (in the sense of a mixture of acetates wherein the true amyl acetate is a predominant constituent); but these have mostly been little productive or have given products of poor quality.

We have found that we can produce an excellent article of amyl acetate from gasolene and similar petroleum distillates as well as from what is called "natural gas gasolene" (products produced by chilling and compressing natural gas).

In the practice of our process, we usually take a good grade of ordinary gasolene of saturated nature and distil it to obtain a fraction boiling between 25 and 45° C. It is best to use a good still head or still and cut this fraction as nearly between these limits as may be; that is as free of higher and lower boiling materials as possible. This fraction we then chlorinate in any desired manner to obtain a product containing mostly monochlor derivatives. Ordinarily, we find it better to carry the chlorination to such an extent that only about 20 per cent. of the oily material is reacted upon by the chlorin. This is for the reason that chlorination to mono derivatives, with exclusion of formation of higher chlorinated bodies, is more successful in the presence of a relatively large excess of hydrocarbons. In so chlorinating, we may dissolve chlorin in the gasolene in the dark and then methodically expose the solution to actinic light, such as a mercury arc lamp or a nitrogen-filled tungsten lamp. The mixture of chlorinated bodies with unchanged hydrocarbons so obtained is then distilled in any suitable way; best after washing out hydrochloric acid, which forms as a result of the chlorinating reaction, and re-drying. The chlorinated products are of higher boiling point than the original hydrocarbons and are readily separated therefrom. We generally distil off everything which will go over below 95° C. and retain for further use the portion boiling between 95° and 140° C., although these limits may be somewhat extended to produce particular products in the hereinafter described operation. Low boiling oils separated from the chlorinated products are returned together with fresh material for rechlorination. In this manner of operation, it will be observed, although only 20 per cent. or thereabout of the gasolene fraction is chlorinated at any one time, in the end the chlorination of all the material may be complete. The portion of the chlorinated mixture boiling above 140° C. may be discarded or used for other purposes. It mainly represents higher chlorinated hydrocarbons, such as dichlorinated materials. With proper work in the hereinbefore described operations, its amount is very small.

The chlorinated hydrocarbons boiling between 95° C. and 140° C. obtained as hereinbefore described or in any other way are next acetylated. They may of course be converted into benzoates, formates or any other esters; but we generally convert them into acetates since the main object of the present invention is to form an artificial amyl acetate of properties similar to that now occurring in commerce. In acetylating this mixture of chlorinated hydrocarbons, or in acetylating the individual chlorinated hydrocarbons of which the mixture is composed, there are, so to speak, two competitive reactions of different velocity which may take place. One such reaction, presuming that sodium acetate is used as one of the acetylating materials, is a direct metathetical exchange, the sodium acetate reacting with the chlorhydrocarbon to form sodium chlorid and acetylated hydrocarbon. This is the desirable reaction; the reaction which forms the desired acetates. The other reaction is the splitting off of HCl from the chlorinated hydrocarbons with the production of an olefin; chlorpentane, for example, yielding HCl and amylene (pentylene). This last reaction represents a loss.

We have found that by keeping the container for the acetylation mixture agitated, as by rotation during the operation, the first reaction can be favored at the expense of the second reaction; or, in other words, our yield of acetates can be greatly increased. The time of operation is also very much shortened. So profound is the influence of this rotation of the container upon the reaction, that we have found it practicable to convert the chlorhydrocarbons into the corresponding acetates with a large yield in a reasonable time by simply rapidly rotating a container holding a mixture of such chlorhydrocarbons with fused and dried sodium acetate without the presence of any solvent whatever. But in practical operation it is better to use a solvent as well. In the presence of the solvent rotation has the same result of accelerating the acetate-forming reaction to an extent where it outstrips the formation of olefins; and to an even greater extent than is the case with materials used without a solvent. As the solvent to be used we may employ acetic acid. This acetic acid is best of the grade known as glacial. Or the liquid product of the reaction itself, that is amyl acetate, may be employed instead. In so operating, it affords a convenient and methodical procedure to use in starting a portion of the liquid reaction products from a prior operation. These liquid products may be such as contain both acetic acid and amyl acetate. A mixture of acetic acid and amyl acetate works better than either solvent singly.

In a typical embodiment of our invention, utilizing the described process, we take a good grade of commercial gasolene (as free from unsaturated bodies as possible) and distil it to obtain a fraction boiling between 25° and 45° C. The residue of the gasolene may be re-sold for its ordinary purposes. This fraction we then charge with dissolved chlorin in the dark and expose to light until reaction takes place as evinced by the disappearance of the yellow color. It may be again charged with chlorin and the operation repeated until about 20 per cent. of the gasolene is chlorinated as evinced by the increase in weight or specific gravity. It may be chlorinated to a greater or less extent; but about 20 per cent. conversion is convenient. This leaves some 80 per cent. of the original hydrocarbons present and this excess prevents the formation of di- and higher chlorinated products. After about 20 per cent. of the oily material is chlorinated, we then wash it with water to remove hydrochloric acid, dry and distil to separate the unchanged hydrocarbons from the chlorinated products. Drying may be effected by calcium chlorid or in any other convenient manner. The drying is desirable since the presence of water affects the boiling point. And in distillation in the presence of water, under the heat of the operation, the water catalyzes the splitting off of HCl (hydrochloric acid) and the formation of olefins. This results in a loss of chlorinated material. The dry chlorinated fraction is next placed in any suitable container capable of being heated and of withstanding pressure and the action of hydrochloric and acetic acids. An ordinary steel vessel lined with copper or enamel and with internal or external means of heat may be employed. To the material is added about an equal weight of carefully dried sodium acetate; the sodium acetate being advantageously first fused to free it of water and to make it more or less voluminous. This quantity corresponds to something like 125 per cent. of the amount of sodium acetate necessary for converting the chlorids present. The autoclave or other container may next be closed and submitted to heat until the temperature arrives at about 200° C. Lower temperatures may be employed but the operation then requires more time. About 200° C. is a very convenient temperature. During the heating and during the reaction the autoclave is given a rotation about its axis. About 30 revolutions per minute will suffice. Under the influence of this rotation the solid particles rub or grind each other so as to keep clean surfaces of the sodium acetate particles available for reaction and facilitate the solution of sodium acetate in the reaction mixture thus keeping the solvent mixture saturated with sodium acetate although sodium chlorid is being continually deposited. In the conversion operation, the chlorin of the chlorinated hydrocarbons combines with the sodium of the sodium acetate to form sodium chlorid which is little soluble in the liquids which are present or are formed in the operation. This sodium chlorid to a certain extent incrusts the particles of sodium acetate and prevents the acetate reacting with the chlorinated hydrocarbons and also prevents the sodium acetate passing into solution. By keeping the solid particles in constant motion this is avoided. In the operation as just described sodium acetate and chlorinated hydrocarbons are placed together in the reaction vessel without any other material. But as the presence of certain solvents or of a relatively large amount of liquid facilitates the reaction, it is better to add a portion of some liquid to the reaction mixture. This liquid may be amyl acetate or some of the liquid product of a prior operation may be employed. Or it may be glacial acetic acid; or glacial acetic acid and the liquid reaction product together may be used. We have found exceptionally good results are obtained by using for 100 parts of the mixture of equal parts of chlorinated material and of acetate, about 64 parts glacial acetic acid and about 64 parts amyl acetate. Or 128 parts of a special solvent obtained as hereinafter described may be used.

A mixture made as described may be heated for about five hours, presuming the temperature to be carried to and maintained at about 200° C. The length of time of heating however depends upon the particular temperature adopted. Temperatures as low as 150° C. may be used but the time of heating is correspondingly prolonged; say, in this instance, as long as 20 hours. On the other hand, by raising the temperature to 220° C. the operation may be finished in about 2 hours. About 200° C. with five hours' heating gives good results; and particularly with the mixture just described. After the mixture has been heated for the required length of time, heating is stopped. The next operation depends upon the particular apparatus employed and the scale on which work is done. On a small scale, the container may be allowed to cool to atmospheric temperature and opened and the contents removed. Within the container will be found an oily liquid and a mass of saline matter. The oily liquid which contains the desired amyl acetate together with the excess of acetic acid, if acetic acid has been used, is drawn or drained off. The saline matter contains considerable amyl acetate entangled within it. Water is therefore added to the mixture which dissolves the salts (which are mainly sodium chlorid) and sets free the oily esters which are not soluble to any extent in a strong salt solution. The oily liquid is separated and added to that drawn off. The oily liquid is next washed with a limited amount of water and re-dried; which may be done with calcium chlorid or any other hygroscopic salt. It is then distilled. The portion distilling below 100° C. is largely liquid olefins. With proper manipulation in the hereinbefore described method the amount of these olefins will be very small. The portion boiling over 100° C. may be directly marketed as amyl acetate.

Operating on a larger scale, after heating for the desired length of time at the desired temperature is finished, the container may be allowed to cool down to, say, 100° C. and the volatile contents blown off, being sent to and through a condenser. During this blowing off operation heat may be applied, as the object is at this time to remove the low boiling oils and materials present. After the portion coming off below 100° C. is distilled over, heating may be continued and the receiver changed. Everything that will boil below 125° C. is now distilled. The distilled liquid so obtained, which is a mixture of acetic acid, amyl acetate, etc., may be used as the "special solvent" before referred to. The digestion vessel is now cooled and the liquid contents removed as before. The salts remaining in the digester, after draining off as much liquid as possible, still contain a large amount of this liquid and water is added to the saline mixture. This results in two layers; an aqueous layer containing the dissolved salts and an oily layer. This oily layer is added to that which was drawn off, the whole washed to remove acetic acid, some of which may be present in this fraction, and dried. The salt solution may be submitted to fractional crystallization to regain such sodium acetate as it still contains.

In using potassium or calcium acetates, the operation is substantially as above described. If other esters than acetates are desired, such as the formates, butyrates, propionates, benzoates, etc., the corresponding alkali salts may be substituted for the acetates.

Instead of rotating the container for the mixture in the manner described, other means of agitation may be employed; as for example stirring or shaking. But we find that to give the whole apparatus containing the reaction mixture a rotating motion is simple, avoids the use of packed joints such as would be necessary with an ordinary stirring device, thus minimizing the chances for leakage, and appears to give the best results. Whether this is due to the coöperation of centrifugal force with a stirring or a grinding action proper or not, is not quite clear. Probably the centrifugal action due to the rotation coöperates in producing the desired results.

In addition to the, so to speak, mechanical advantage of the agitation or rotation in keeping the surfaces of the reaction mixture free of incrusting deposits, there is also the great additional advantage that the solvent power on the sodium acetate of the liquids present is utilized to a much greater extent. Sodium acetate while soluble in glacial acetic acid and the other liquids present in this reaction is not quickly soluble therein; it does not dissolve rapidly in these liquids at rest. And as the reaction steadily exhausts the acetate which is in solution, if the liquid be kept at rest the amount of dissolved acetate is soon reduced to a minimum. And we find that among other results of operating in the manner described, we keep the amount of sodium acetate which is dissolved in the reaction liquids present at a maximum. It is probable that this has much influence in the stated acceleration of the desired type of reaction at the expense of the undesired type. The influence of this rotation of the reaction mixture, not only upon the speed of operation but upon the yields obtained, may be illustrated by the results of certain careful comparative work.

In one pair of parallel experiments, using the same apparatus, temperatures, mixtures, etc., it was found that with the whole apparatus rotating at a rate of about 30 revolutions per minute, the operation was complete in about five hours with a production of 384 pounds of crude amyl acetate from 580 pounds of crude chlorids. In a similar operation but without rotation of the container and mixture, from the same quantity of crude chlorids, the yield of crude amyl acetate was only 281 pounds in the same time. In the first operation just mentioned with the rotating container, the crude amyl acetate obtained carried only 1.2 per cent. chlorin; that is it was substantially free from unchanged chlorids. On the other hand in the mixture which had remained quiet, the proportion of chlorin was as high as 7.1 per cent. In operating with a mixture at rest, to bring the amount of residual chlorin in the amyl acetate produced as low as 2 per cent. requires heating for at least 24 hours, and the yield from 580 pounds of crude chlorids is 280 pounds of crude acetate of boiling point above 100° C. In this operation, the influence of rotation, we find, is to suppress, to a large extent, the useless conversion of chlorinated hydrocarbons into olefins and hydrochloric acid as is shown by the much higher yield of crude acetate. Instead of chlorinating a saturated gasolene in order to get monochlor products in the manner just described, such monochlor products may be obtained from suitable low boiling fractions of the unsaturated or cracked gasolenes, which are now on the market, by heating such a fraction with hydrochloric acid; or with a mixture of salt and sulfuric acid.

In the accompanying illustration we have shown, more or less diagrammatically, sundry embodiments of apparatus elements useful in the described process.

Figure 2:
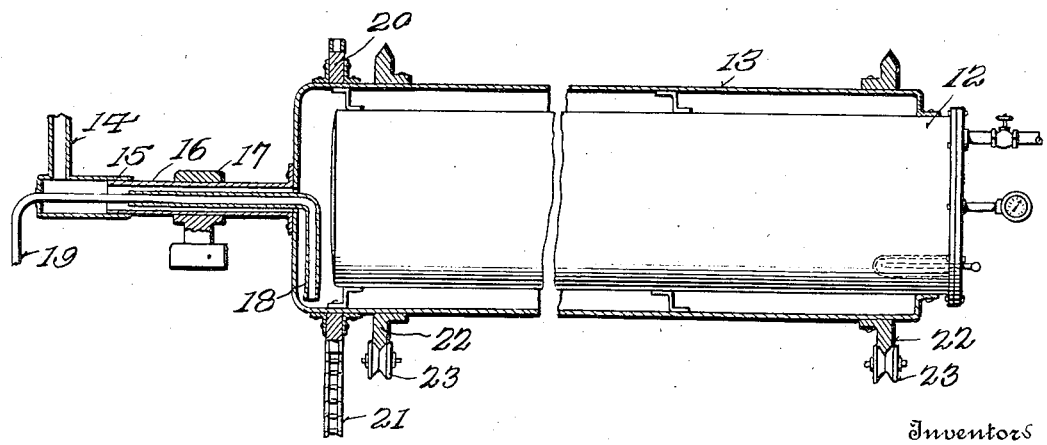

In this showing, Figure 1 is an elevation, certain parts being in section, of a rotatable digester provided with flame-heating means; and Fig. 2 is a similar view of a modified apparatus having means for heating by steam or hot liquids.

In the showing of Fig. 1, element 1 is a container rotatable about a central axis by means of sprocket 2 and sprocket chain 3. As shown, it is carried by wheels 4 through bearing ring 5. Beneath it is heating means 6 shown as a gas burner. At one end, the container is provided with flange 7 to which may be bolted cover 8. Its cover carries valved discharge pipe 9, pressure gage 10 and thermometer 11.

In the showing of Fig. 2, digester 12 is surrounded by heating jacket 13. Heating vapor or liquid may be carried into this jacket from source of the same 14 communicating with stationary sleeve 15. Rotatably mounted within this sleeve is another sleeve 16 which may be journaled at 17. As shown, this second sleeve has free communication with the interior of the jacket. Passing within the jacket to a low point is drain-pipe 18 passing outwardly through the rotatable and fixed sleeves to a point of exit 19. Drive is by sprockets 20 and sprocket chain 21. The apparatus rotates through bands 22 upon bearing wheels 23. This form is provided with a flanged cover like that of Fig. 1.

What we claim is:—

1. The process of making esters which comprises heating an organic salt of an alkali metal with a liquid comprising pentyl chlorid under pressure and during such heating forcibly agitating the mixture.

2. The process of making esters which comprises heating an organic salt of an alkali metal with a liquid comprising pentyl chlorid under pressure in a suitable container and during such heating rotating the container.

3. The process of making esters which comprises heating an acetate of an alkali metal with a liquid comprising pentyl chlorid under pressure and during such heating forcibly agitating the mixture.

4. The process of making esters which comprises heating an acetate of an alkali metal with an organic halogen compound under pressure in a suitable container and during such heating rotating the container.

5. The process of making esters which comprises forming mono-halogen derivatives of the hydrocarbons of a gasolene fraction boiling between about 25° C. and 45° C., mixing with an alkali salt of an organic acid and heating under pressure while forcibly agitating.

6. The process of making esters which comprises forming mono-halogen derivatives of the hydrocarbons of a gasolene fraction boiling between about 25° C. and 45° C., mixing with an alkali salt of an organic acid and heating under pressure in a suitable container while rotating said container.

7. The process of making esters which comprises forming mono-halogen derivatives of the hydrocarbons of a gasolene fraction boiling between about 25° C. and 45° C., mixing with an acetate of an alkali metal and heating under pressure while forcibly agitating.

8. The process of making esters which comprises forming mono-halogen derivatives of the hydrocarbons of a gasolene fraction boiling between about 25° C. and 45° C., mixing with an acetate of an alkali metal and heating under pressure in a suitable container while rotating said container.

In testimony whereof, we affix our signatures hereto.

HARRY ESSEX.
BENJAMIN T. BROOKS.